July 7, 1925.
J. I. COX
SPRING WHEEL
Filed June 21, 1922
1,545,130
Fig. 1.
Fig. 2.
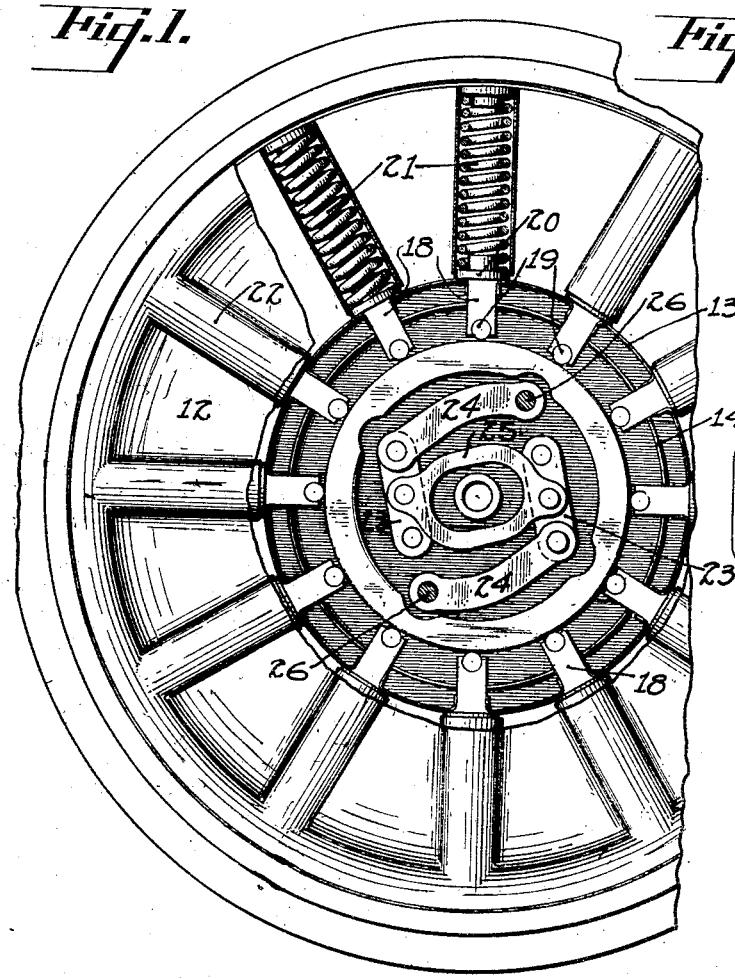
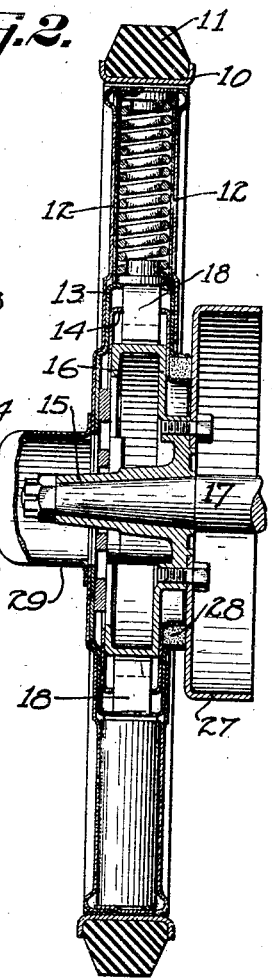
Inventor
JOSEPH I. COX.
By Drury, Strong, Townsend and Loftus
Attys Patented July 7, 1925.

1,545,130

UNITED STATES PATENT OFFICE.

JOSEPH I. COX, OF DETROIT, MICHIGAN, ASSIGNOR TO SPRING HUB WHEEL COMPANY, OF SAN FRANCISCO, CALIFORNIA, A CORPORATION OF NEVADA.

SPRING WHEEL.

Application filed June 21, 1922. Serial No. 569,771.

*To all whom it may concern:*

Be it known that I, JOSEPH I. COX, a citizen of the United States, residing at Detroit, county of Wayne, and State of Michigan, have invented new and useful Improvements in Spring Wheels, of which the following is a specification.

This invention relates to spring hub wheels of the type shown and described in United States Letters Patent No. 1,320,663, issued November 4th, 1919 to Carl F. Westermann.

The object of the present invention is to simplify and improve the construction and operation of a wheel of this type. A wheel of this type includes generally a rim, a hub housing fixed with relation to the rim and a hub within the housing carried in a floating manner upon spring-pressed plungers. Links are arranged between the floating hub and its housing for transmitting the torque without in any way interfering with free radial movement of the hub within its housing. In the prior patent referred to, cast metal was largely used in the construction of the wheel, including a cast metal hub housing and cast metal spokes, the latter being bored to receive the plungers and their springs. In the present wheel I make use of steel disks to form the body portion of the wheel and a hub housing also of pressed steel, preferably made in two parts. The disks are formed with pockets to receive the springs, and the plungers are carried and guided by the two-part hub housing. The hub has a channel-shaped flange fitting slidably between the walls of the hub housing and resting upon rollers carried by the inner ends of the plungers.

One form which my invention may assume is exemplified in the following description and illustrated in the accompanying drawings, in which—

Fig. 1 shows a side elevation, partly in section, of a wheel embodying my invention.

Fig. 2 shows a cross sectional view of the same.

The wheel shown herein comprises a rim 10, preferably fitted with a solid tire 11. The rim is demountably carried upon a pair of spaced disks 12 formed of pressed steel. Between the disks near their central portion is arranged a hub housing also of pressed steel and comprising an outer U-shaped ring 13 and an inner U-shaped ring 14. Carried within the hub housing is a floating hub consisting of a central bearing portion 15 and an annular channel-shaped flange 16, the latter extending slidably into the inner U-shaped ring of the hub housing. The hub is fixed in the usual way upon an axle shaft 17.

Arranged at intervals around the housing and extending slidably through openings in the inner and outer members of the same are radial plungers 18, each having its inner end fitted with a roller 19 bearing against the periphery of the channel-shaped flange 16 of the hub. The outer end of each plunger has a flange 20 to contact with the outer member of the hub housing whereby to limit the inward movement of the plunger. Each plunger is pressed inwardly by a helical coiled spring 21, which springs are carried within radial pockets 22 formed by pressing each of the disks 12 convexly. Thus the hub is supported throughout by the springs.

The driving connections between the hub and its housing are such as to permit free movement of the hub in any direction at right angles to its axis. These connections include two inner links 23 pivotally connected to the flange of the hub at one end and two outer links 24 pivoted to the inner links at one end and to the hub housing at the other end and a yoke 25 connecting the two inner links across. The operation of these links is set forth in the prior patent referred to.

It will be noted that the wall of the outside disk and the adjacent wall of the outer housing make contact with each other to form a wall of double thickness adjacent the hub of the wheel. The pivots 26 for the outer links extend through this double wall.

In the case of the rear wheel, a brake drum 27 is bolted to the flanged member of the hub and the walls of the inner and outer housing members adjacent the brake drum are bent outwardly at right angles to form an annular pocket for packing material 28, which packing material contacts with the brake drum to prevent entrance of dust or dirt to the hub. The central opening in the opposite side of the wheel is closed by a hub cap 29, which protects the axle shaft and hub from dust and dirt.

The above recited structure provides a spring hub wheel which is at once light and inexpensive and rugged. All working parts are enclosed and protected from dust and dirt and the wheel in consequence has a much better appearance. The friction between the plungers and the rim of the hub is reduced by the use of the rollers 19.

Various changes in the construction and arrangement of the several parts herein shown and described may be employed without departing from the spirit of the invention as disclosed in the appended claims.

Having thus described my invention, what I claim and desire to secure by Letters Patent is:

1. A spring hub wheel of the character disclosed comprising a hub housing in the form of a U-shaped ring, spring-pressed plungers carried by the hub housing, a hub within the housing having a bearing portion and a channel-shaped annular flange, the latter fitting slidably between the walls of the housing and resting upon the plungers.

2. A spring hub wheel of the character disclosed comprising a hub housing in the form of an inner and outer U-shaped ring of pressed metal, radially extending spring-pressed plungers movably mounted on said housing and a hub arranged within the housing and supported by said plungers.

3. A spring hub wheel of the character disclosed comprising a hub housing in the form of an inner and outer U-shaped ring of pressed metal, radially extending spring-pressed plungers movably mounted on said housing, a hub arranged within the housing and supported by said plungers, a brake drum bolted to the inner end of the hub, the walls of said rings adjacent the drum being bent to form an annular pocket, and packing material in said pocket contacting with said drum.

4. A spring hub wheel of the character disclosed having its body portion formed of two disks spaced apart, a hub housing fitted between the disks near the center thereof, plungers carried by the hub housing, springs between the disks acting on the plungers, a hub within the housing supported by said plungers, said hub housing being U-shaped in cross section and having its outside wall in contact with the outer disk, links pivoted to the hub and other links pivoted to the first-mentioned links and connected in turn to contacting walls of the outside disk and hub housing.

5. A spring hub wheel of the character disclosed having its body portion formed of two disks spaced apart, a hub housing of pressed metal and U-shaped in cross section fitting between the disks near the center thereof, radially movable plungers carried by the hub housing, springs acting on said plungers, said springs being arranged in radial pockets formed by convexing said disks and a hub within the housing supported by said plungers.

6. A spring wheel comprising a pair of discs adapted to be secured together in spaced relation, a series of radially extending tubes secured in position between the discs, a coiled spring in each tube, a pair of annular members secured together in radial spaced relation, the annular members having apertures in radial alignment with the tubes, a series of roller blocks slidably mounted in the apertures of the annular members, the outer ends of the roller blocks extending into the respective tubes and being supported by the respective spring, the annular members being provided with flanges riding on the flat faces of the cylindrical hub extension, each roller block being provided with a roller riding on the cylindrical face of the hub extension and a driving connection between the wheel and hub allowing diametrical movement of the wheel in relation to the hub.

7. A spring wheel comprising a pair of discs secured in spaced relation, the discs being provided with semi-circular radially extending recesses positioned opposite each other when the discs are secured together, a tube fitting each pair of recesses, a coiled spring within each tube, a roller block slidably mounted in the inner end of each tube, a roller rotatably mounted in the end of each roller block, a hub for the wheel having a cylindrical extension on which the said rollers are adapted to ride, a series of annular members in which the roller blocks are supported, the annular members being provided with flanges engaging on opposite sides of the hub extension, and a driving connection between the hub and wheel allowing diametrical movement of the wheel in relation to the hub.

8. A spring wheel comprising a pair of discs adapted when secured together to form a series of radially extending cylindrical chambers, a tube fitting each chamber, a coiled spring within each tube, a hub for the wheel having a cylindrical extension provided with flat faces on each side thereof, a spring pressed member slidable in each tube and supported by the spring, a roller carried by each spring pressed member and adapted to ride on the cylindrical face of the hub extension, a series of annular members supporting the spring pressed member and provided with flanges engaging the flat side faces of the cylindrical hub extension and a driving connection between the hub and wheel allowing diametrical movement of the wheel in relation to the hub.

9. A spring wheel comprising a hub having a cylindrical extension provided with flat faces on the opposite sides thereof, a pair of discs secured together in spaced relation, a pair of annular members secured to the discs and adapted to ride on the flat faces of the cylindrical hub extension, a series of spring restrained members positioned about the cylindrical hub extension, a series of rollers positioned between the cylindrical face of the hub extension and spring restrained members, and a driving connection between the hub and discs permitting diametrical movement of the discs in relation to the hub.

10. A spring wheel comprising a hub having a cylindrical extension provided with parallel side faces, a pair of discs secured together in spaced relation and means carried thereby riding upon the opposite flat faces of the hub extension, a series of spring supported blocks positioned about the cylindrical face of the hub extension and having roller contact therewith, and a driving means connecting the hub and the discs permitting movement of the discs in the plane of the hub.

JOSEPH I. COX.